May 12, 1931.  S. C. DUTY  1,804,973
COUPLER
Filed April 25, 1930
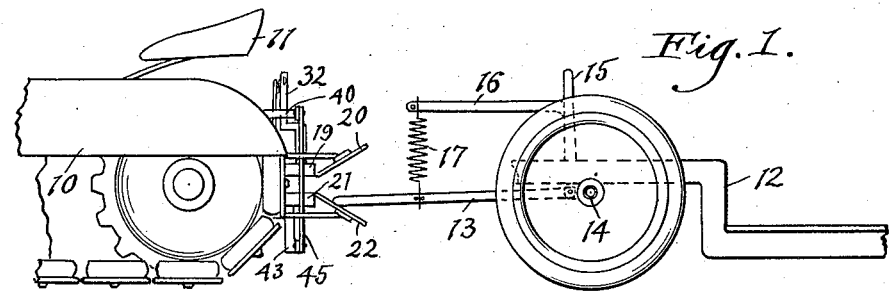
Fig. 1.
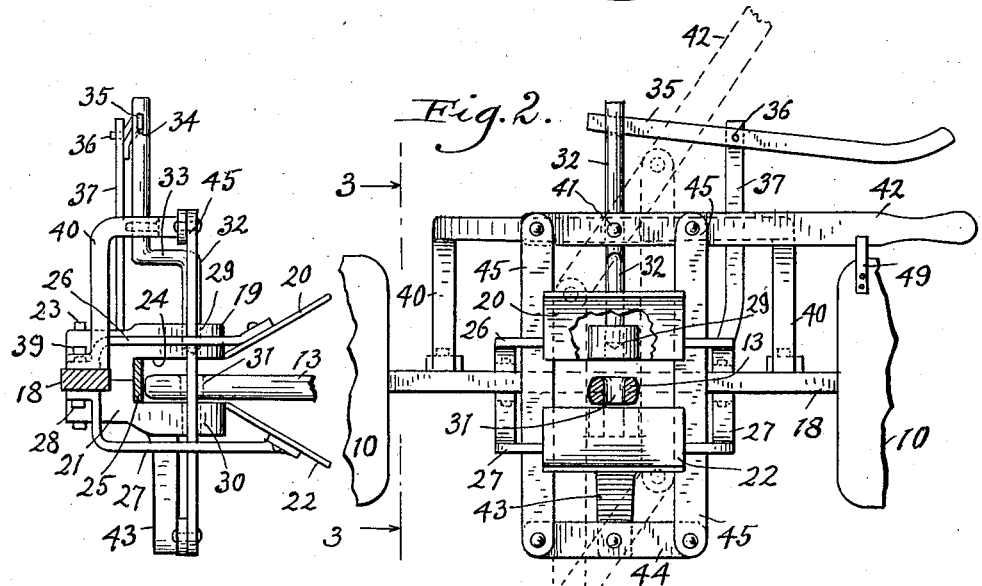
Fig. 2.
Fig. 3.
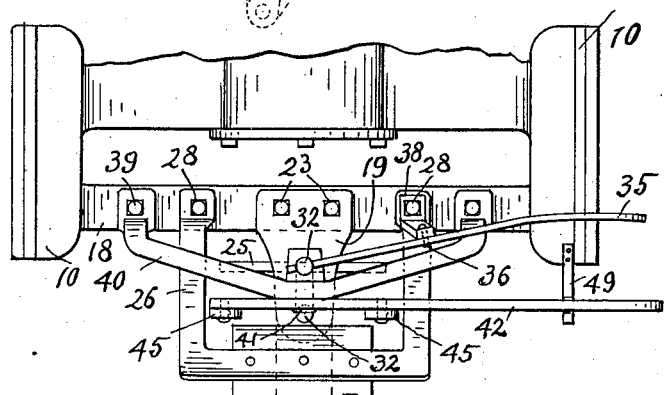
Fig. 4.
Inventor
Spencer C. Duty
Kwis Hudson & Kent
attys.

Patented May 12, 1931

1,804,973

UNITED STATES PATENT OFFICE

SPENCER C. DUTY, OF CLEVELAND HEIGHTS, OHIO

COUPLER

Application filed April 25, 1930. Serial No. 447,178.

This invention relates to improvements in couplers for vehicles, particularly couplers for removably attaching trailers to trucks or tractors.

One of the objects of the invention is the provision of a coupler, the coupling elements of which may be connected or disconnected by the driver of the truck or tractor without leaving his seat.

Another object is the provision of a coupler of the character stated which shall interpose no interference with the free swinging of the trailer tongue laterally in making turns.

Other objects and features of novelty will appear as I proceed with the description of that embodiment of the invention which, for the purposes of the present application, I have illustrated in the accompanying drawings, in which Figure 1 is a side elevation showing a tractor being backed into coupling relation with a trailer, and illustrating the coupling members of my invention.

Fig. 2 is a rear view of the tractor with its coupling member and associated parts, the tongue of the trailer being shown in vertical transverse section.

Fig. 3 is a side elevational view of the coupler, the view being partly in vertical section upon the line 3—3 of Fig. 2, and Fig. 4 is a plan view of the structure shown in Fig. 2.

In Fig. 1 I have shown at 10 a fragment of a track-laying tractor, having a driver's seat 11. Obviously, however, the invention is clearly well adapted for use in connection with wheeled tractors or in connection with trucks or other vehicles.

In the same figure I have illustrated the forward end only of a trailer 12 provided with a forwardly extending tongue 13 which may be mounted upon the front axle 14 of the trailer in such manner as to have a certain amount of movement vertically thereupon. To this end, the frame of the trailer may be provided with a standard 15 from which extends forwardly a rigid arm 16. From the forward end of this arm the tongue 13 is resiliently supported by means of a coil spring 17. The tongue is therefore free to swing with the axle 14, while it is supported in an approximately horizontal position. It is nevertheless free to move vertically either toward or away from the supporting arm 16.

At the rear end of the power vehicle 10 I utilize as a support for the coupler, or that portion of the same which is to be mounted on this vehicle, a transverse bar 18. In cases where no such bar is provided by the tractor manufacturer, a bar of this character can be mounted at the rear end of the tractor frame. The tractor portion of the coupler comprises essentially a pair of jaws, open at their sides and diverging vertically toward the rear. These jaws may be formed in one or more pieces, as may be found convenient and economical in manufacture, and they may be supported in any desired manner from the bar 18, or otherwise. As herein illustrated each jaw is formed in two pieces. The upper jaw comprises a casting 19 horizontally arranged and an inclined sheet metal plate 20 overlapping the casting an equal amount on each side thereof. The lower jaw comprises a casting 21 and an inclined sheet metal plate 22, the latter being identical in size and form with the plate 20. The castings 19 and 21 are recessed at their forward extremities to fit upon the bar 18, and are secured thereto by bolts 23 or the like. As will be apparent from an inspection of Fig. 3, the two castings 19 and 21 are oppositely recessed at their rear ends to form a tongue receiving opening 24. At the forward end of this opening, and overlapping it considerably on either side, is a bar 25 which I term a backstop. The plates 20 and 22 are riveted to U-shaped yokes or brackets 26 and 27 which are secured to the bar 18 by bolts 28 or the like. The forward edges of the plates 20 and 22 meet the rear inner corners of the castings 19 and 21, and may be welded or otherwise joined to the castings at that point so as to make a smooth union which will facilitate the passage of the tongue 13 either into or out of the recess 24.

The castings 19 and 21 are provided with aligned vertical openings 29 and 30. The tongue 13 has a similar opening 31 which comes into alignment with the openings 29 and 30 when the tongue is centrally positioned with its forward end against the back-stop 25. A coupling pin 32 may then be lowered through the opening 29 into and through the opening 31, and then into the opening 30, the openings 29 and 30 serving as guides for the pin. In order to clear other portions of the apparatus presently to be described, the pin 32 is provided with an offset 33. Near its upper extremity this pin is provided with a vertical slot 34, through which extends one end of an operating lever 35 which is fulcrumed at 36 upon a standard 37, the latter being provided with a foot 38 which surmounts the adjacent end of the U-shaped bracket 26 and is secured in place by the same bolt 28.

On the bar 18 I mount by suitable fastenings 39 an upwardly extending yoke 40, which is bowed backwardly at its central portion and there carries a horizontal pivot bolt 41 upon which is supported a handled lever 42. Integral with the casting 21 there is a depending bracket 43 at the lower end of which is pivotally mounted a link 44. Vertical links 45 of equal length, which I term "squeeze bars," are pivotally connected at their upper and lower ends respectively with the lever 42 and the link 44. The pivot points of these bars are spaced apart equal distances both above and below, so that a parallelogram is formed. The pivot points of the lever 42 and link 44 are also spaced equal distances from the vertical bars 45. The parts making up this parallelogram are so positioned that the squeeze bars 45 are brought into the same vertical plane with the openings 29 and 30 and the coupler pin mounted therein.

Assuming that the trailer 12 has been loaded or unloaded, as the case may be, and it is desired to transport it from one place to another, the driver of the tractor 10 raises the coupler pin 32 by depressing the outer end of lever 35, and then backs the tractor toward the front end of the trailer, causing the diverging portions 20, 22 of the jaws to receive the front end of the tongue between them, as indicated in Fig. 1. Continued movement of the trailer at a slow rate of travel causes the plate 22 to deflect the tongue upwardly to the space between the forward edges of the plates. The operator then continues the backing of the tractor until the forward end of the tongue strikes the back-stop 25, which is constructed of fairly heavy material so as to be able to take such strains as may be imparted to it. The driver of the tractor may not be able to guide it accurately enough to bring the tongue 13 exactly into line with the guides for the coupler pin 32, particularly if the ground be more or less uneven, but he can, without difficulty, cause the tongue to enter the space between the plates 20 and 22 and between the squeeze bars 45 in the normal positions of the latter. When this is done, the operator, without releasing his hold upon the lever 35, grasps the end of lever 42 in his other hand and pulls the lever up to the dotted line position of Fig. 2. The squeeze bars are thereby caused to move parallel to themselves toward each other into the dotted line position, and the tongue 13 is accordingly moved laterally to the exact center, that is to a position where its opening 31 is directly in line with the openings 29 and 30. The operator then pulls up on lever 35, whereby the pin 32 is projected downwardly through openings 29, 31 and 30, gravity assisting in this operation, after which the operator releases his hold upon lever 42. The lever 42 is the only element of the parallelogram which is not substantially balanced, and the weight of this lever, being principally to the right of pivot 41, as viewed in Fig. 2, brings the parts of the parallelogram back to the full line position of that figure. Any convenient stop, such as a piece of strip steel 49 riveted to a portion of the tractor, may be employed to limit the downward movement of the lever 42.

It will thus be seen that the coupling of the two vehicles together may be accomplished readily and quickly by the driver of the tractor without his leaving his seat, and this facility is quite important where a tractor must be employed to move a great many different trailers or trains of trailers or where a limited number of trailers or trains of trailers must be moved back and forth between given points a number of times in a working day. The coupler jaws on the tractor are open horizontally, and there is no obstruction to the free swinging of the tongue 13 through a large arc in making turns. The squeeze bars 45 form stops limiting the extent of this movement, but it will be noted that they are located in the same vertical plane with the coupler pin 32, about which the tongue swings, so that the arc of movement of the latter is through a possible angle of almost 180°.

While the "squeeze bars" in the form illustrated are preferred by me, it will be obvious that such bars might be otherwise mounted and operated, and that in fact their function might be performed by mechanical means not bars at all in the strict sense of the term. Hence, I desire it to be understood that where the term "squeeze bars" unmodified is employed herein it has a broad significance, indicating mechanical elements movable transversely toward or away from each other.

In the foregoing description and in the accompanying drawing I have disclosed in considerable detail one particular embodiment of the invention, nevertheless I desire it to be understood that such detail disclosure has been resorted to primarily for the purpose of fully illustrating the invention in conformity with the statute, and is not to be considered as amounting to a limitation upon the scope of the invention.

Having thus described my invention, I claim:

1. In combination, a coupler member for use in connection with a tongue having an opening therethrough, said member comprising jaws adapted to receive said tongue, a coupling pin adapted to be projected through openings in said jaws and through said tongue opening, and a pair of squeeze bars movable transversely of said jaws for drawing said tongue into position in alignment with said jaw openings.

2. In combination, a coupler member for use in connection with a tongue having an opening therethrough, said member comprising jaws adapted to receive said tongue, a coupling pin adapted to be projected through openings in said jaws and through said tongue opening, a pair of squeeze bars movable transversely of said jaws for drawing said tongue into position in alignment with said jaw openings, and means for simultaneously operating said squeeze bars to move them toward or away from each other.

3. In combination, a coupler member for use in connection with a tongue having an opening therethrough, said member comprising jaws adapted to receive said tongue, a coupling pin adapted to be projected through openings in said jaws and through said tongue opening, and a pair of squeeze bars mounted in the same plane as said pin, said squeeze bars being movable transversely of said jaws for drawing said tongue into position in alignment with said openings.

4. In a coupler for joining two vehicles, a coupler member for one vehicle comprising a tongue having a vertical opening therethrough, and a coupling member for the other vehicle comprising upper and lower diverging jaws adapted to receive said tongue when said vehicles are caused to approach each other, said jaws having opposed openings therein, a coupling pin adapted to be projected through said opposed openings and through the opening in said tongue, and a pair of squeeze bars movable transversely of said jaws for drawing said tongue transversely into position in alignment with said jaw openings.

5. In combination, a coupler member for use in connection with a tongue having an opening therethrough, said member comprising jaws adapted to receive said tongue, a back-stop at the inner end of said jaws against which the end of the tongue is adapted to bear, a coupling pin adapted to be projected through the openings in said jaws and through said tongue opening, and a pair of squeeze bars movable transversely of said jaws for drawing said tongue into position in alignment with said jaw openings.

6. In combination, a coupler member for use in connection with a tongue having an opening therethrough, said member comprising jaws adapted to receive said tongue, a coupling pin adapted to be projected through openings in said jaws and through said tongue opening, a pair of parallel squeeze bars standing normally at opposite sides of said jaws, and means for moving said bars inwardly toward each other while maintaining their parallel relation, for drawing said tongue into position in alignment with said jaw openings.

7. In a coupling member for use upon a power vehicle, a pair of fixed upper and lower jaws diverging outwardly, a back-stop mounted at the inner ends of said jaws in line with the opening between them, said jaws being adapted to receive the free end of a tongue coupling member attached to a vehicle to be moved, and said jaws being adapted to direct the end of said tongue into engagement with said back-stop, a pair of upright squeeze bars arranged normally at the sides of said jaws, means within reach of the driver of the power vehicle for drawing said squeeze bars inwardly to move the tongue transversely to a central position, and means also within reach of the driver for operatively engaging said tongue when the latter is in its central position.

In testimony whereof, I hereunto affix my signature.

SPENCER C. DUTY.